United States Patent
Ferren et al.

(10) Patent No.: US 7,852,622 B2
(45) Date of Patent: Dec. 14, 2010

(54) DEPLOYABLE DISPLAY APPARATUS FOR VEHICLE

(75) Inventors: Bran Ferren, Beverly Hills, CA (US); Dana Klaren, Santa Clara, CA (US); Lars Jangaard, Los Angeles, CA (US); Christian Carlberg, Arroyo Grande, CA (US); Clinton Blake Hope, Glendale, CA (US)

(73) Assignee: Northrop Grumman Space & Mission Systems Corporation, Los Angeles, CA (US)

( * ) Notice: Subject to any disclaimer, the term of this patent is extended or adjusted under 35 U.S.C. 154(b) by 0 days.

(21) Appl. No.: 11/961,690

(22) Filed: Dec. 20, 2007

(65) Prior Publication Data

US 2009/0161302 A1     Jun. 25, 2009

(51) Int. Cl.
*H05K 7/14* (2006.01)

(52) U.S. Cl. ........................... 361/679.05; 361/679.04; 361/679.01; 248/917

(58) Field of Classification Search ................ 361/681, 361/679.05, 679.04, 679.01; 249/917
See application file for complete search history.

(56) References Cited

U.S. PATENT DOCUMENTS

| | | | | |
|---|---|---|---|---|
| 5,751,548 A * | 5/1998 | Hall et al. | ............... | 361/679.41 |
| 6,213,438 B1 * | 4/2001 | Ostby et al. | ............... | 248/276.1 |
| 6,315,252 B1 * | 11/2001 | Schultz | ........................ | 248/160 |
| 6,386,413 B1 * | 5/2002 | Twyford | ..................... | 224/553 |
| 7,121,514 B2 * | 10/2006 | Twyford | .................. | 248/177.1 |
| 7,380,759 B1 * | 6/2008 | Whiteside et al. | ......... | 248/183.1 |
| 2006/0268500 A1 * | 11/2006 | Kuhn | ......................... | 361/683 |

* cited by examiner

*Primary Examiner*—Jayprakash N Gandhi
*Assistant Examiner*—Ingrid Wright
(74) *Attorney, Agent, or Firm*—Tarolli, Sundheim, Covell & Tummino LLP

(57) ABSTRACT

A vehicle has a personnel compartment including a necessary driving volume. A deployable display apparatus provides a plurality of visual display units to a vehicle. The vehicle has a personnel compartment including a necessary driving volume. At least one display housing is provided. Each display housing is configured to support at least one visual display unit. The visual display unit is configured to selectively provide visual information to an operator. At least one mounting arm has spaced-apart first and second arm ends. The first arm end is stationary relative to a base surface. The second arm end is attached to the display housing. The mounting arm is configured to selectively move the display housing between stowed and deployed positions such that at least one display housing, when in the deployed position, at least partially occupies the necessary driving volume, and the display housing, when in the stowed position, is wholly outside the necessary driving volume.

25 Claims, 7 Drawing Sheets

DEPLOYABLE DISPLAY APPARATUS FOR VEHICLE

TECHNICAL FIELD

The present invention relates to information display and interaction, and, more particularly, to an apparatus and method for changing a confined environment, such as a vehicle, between driving and information interaction modes, with attention to relevant human factors

BACKGROUND

A number of environments have been developed for users to interact with large amounts of information for such applications as command and intelligence centers for commercial, government, and military use. For example, a number of different sensors, cameras, consoles, monitors, user input devices, computers, or other information gathering, transmitting, and/or storage devices could be connected to other such devices via a communications network. Many of these information center applications involve the provision of large volumes of sophisticated information.

To present to the user a broad range of information simultaneously, it may be desirable to accommodate multiple displays, optionally interactive, properly positioned, and in as large a format as possible, compatible with the space available and the display-to-user distance. On land, these information centers are generally placed in stationary or transportable platforms, requiring lengthy setup times. Mobile information centers may be available, but these require a vehicle with a large specialized volume. This additional volume for fixed displays and operators increases the bulk and weight of the vehicle, limiting mobility and use of standard vehicle types. Most standard vehicles have confined interiors and do not have the spare volume to conventionally mount large or numerous displays without impairing safe vehicle function.

However, for practical purposes of maintaining communications and physical stability, mobile command centers are generally used while stationary. It is therefore possible to repurpose interior vehicle cabin volume normally used during mobile operation of the vehicle to double in use for information display and/or interaction when the vehicle is parked. The volume can thus be used for different purposes in a stationary, information display mode than in a mobile, driving mode. An example of available volume might be in the front driving compartment of a typical vehicle—i.e., the volume adjacent to the windshield and between the driver and front seat passenger.

SUMMARY

The present invention relates to an apparatus and method for changing a vehicle configuration between driving and information display modes. One aspect of the present invention provides a deployable display apparatus for providing a plurality of visual display units to a vehicle. The vehicle has a personnel compartment including a necessary driving volume. At least one display housing is provided. Each display housing is configured to support at least one visual display unit. The visual display unit is configured to selectively provide visual information to an operator. At least one mounting arm has spaced-apart first and second arm ends. The first arm end is stationary relative to a base surface. The second arm end is attached to the display housing. The mounting arm is configured to selectively move the display housing between stowed and deployed positions such that at least one display housing, when in the deployed position, at least partially occupies the necessary driving volume, and the display housing, when in the stowed position, is wholly outside the necessary driving volume.

Another aspect of the present invention provides a system for selectively displaying visual information. A first display housing is configured to support a plurality of visual display units. The visual display units are configured to selectively provide visual information to an operator. A first mounting arm has spaced-apart first and second arm ends. The first arm end is stationary relative to a base surface. The second arm end is attached to the first display housing. The first mounting arm is configured to selectively move the first display housing between stowed and deployed positions, such that the first display housing, when in the deployed position, occupies a first display volume, and the first display housing, when in the stowed position, is wholly outside the first display volume.

Yet another aspect of the present invention provides a deployable display apparatus for a vehicle, the vehicle having a personnel compartment including a necessary driving volume. A display housing is configured to support at least one visual display unit. The visual display unit is configured to selectively provide visual information to an operator. At least one mounting arm has spaced-apart first and second arm ends. The first arm end is stationary relative to a base surface. The second arm end is attached to the display housing. At least a portion of the mounting arm is a variable parallelogram. The mounting arm is configured to selectively move the display housing between stowed and deployed positions, such that the display housing, when in the deployed position, at least partially occupies the necessary driving volume, and the display housing, when in the stowed position, is wholly outside the necessary driving volume.

Yet another aspect of the present invention provides a deployable display apparatus for a vehicle, the vehicle having a personnel compartment including a necessary driving volume, a driver seating area, and a passenger seating area. A display housing is configured to support at least one visual display unit. The visual display unit is configured to selectively provide visual information to an operator. At least one mounting arm has spaced-apart first and second arm ends. The first arm end is stationary relative to a base surface. The second arm end is attached to the display housing. The mounting arm is configured to selectively move the display housing between stowed and deployed positions. The display housing, when in the deployed position, at least partially occupies the necessary driving volume, such that the display housing, when in the stowed position, is wholly outside the necessary driving volume and at least partially interposed between the driver seating area and the passenger seating area.

Yet another aspect of the present invention provides a method for selectively deploying a visual display in a vehicle, the vehicle having a personnel compartment including a necessary driving volume. The method includes anchoring a first end of a mounting arm to a base surface. A second end of the mounting arm is attached to a display housing. A plurality of visual display units are mounted in the display housing. The display housing is positioned in a stowed position. The mounting arm is manipulated to place the display housing in a deployed position wherein the display housing is at least partially located within the necessary driving volume.

DETAILED DESCRIPTION

Figure 1:
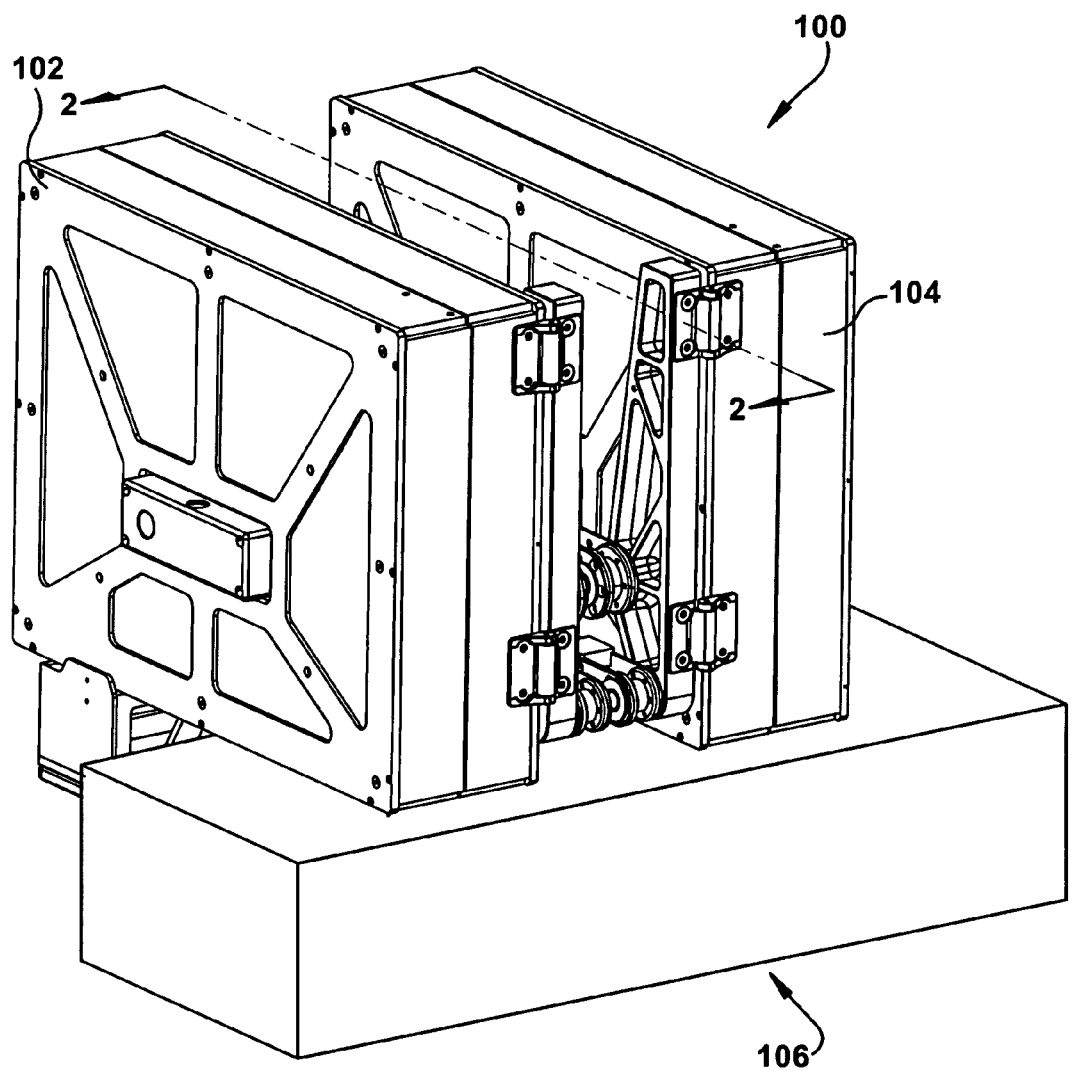
FIG. 1 depicts a perspective view of a deployable display apparatus in a stowed position, in accordance with an aspect of the present invention.

FIG. 1 depicts a deployable display apparatus 100 in accordance with an aspect of the present invention. The deployable display apparatus 100 may be used in a system for selectively displaying visual information. For example, the deployable display apparatus 100 may be useful in an information center application, when combined with one or more sensors, cameras, consoles, monitors, user input devices, computers, or other information gathering, transmitting, and/or storage devices, and optionally placed into communication with one or more other such devices. The deployable display apparatus 100 includes a first display housing 102, configured to support at least one visual display unit (not shown). The first display housing 102 shown in the Figures has a frame-like form, which at least partially encloses the visual display units. However, it is contemplated that a display housing could be a bracket, plate, or other suitable holding structure; one of ordinary skill in the art can readily provide a first display housing 102 to support a particular visual display unit. The first display housing 102 could be integral with a visual display unit or separately provided, as shown and discussed here.

The visual display unit is configured to selectively provide visual information to an operator. The below description presumes that the first display housing 102 supports two visual display units, but one of ordinary skill in the art can readily provide any desired number of visual display units. The first display housing 102 is depicted in a stowed position in FIG. 1, but may be moved to a deployed position, described below, as desired by the operator.

In the deployable display apparatus 100 shown in FIG. 1, a second display housing 104 is shown, and will be presumed in the following discussion for ease of discussion. The second display housing 104 of FIG. 1 is described hereinafter, as a mirror-image of the first display housing 102, selectively operating independently thereof. When present, however, the second display housing 104 (or any number of additional primary display housings which may be provided but are not shown) may take any suitable form, and operate in any suitable manner, as desired for a particular application of the present invention. In FIG. 1, the first and second display housings 102 and 104 are depicted as being supported by a base surface 106, which may be a standalone and/or dedicated structure, or a portion of another element/housing/structure, as dictated by the needs of a particular use environment of the deployable display apparatus 100.

The second display housing 104 of FIG. 1 is configured to support at least one visual display unit (not shown). The visual display unit is configured to selectively provide visual information to an operator. The below description presumes that the second display housing 104 supports two visual display units, but one of ordinary skill in the art can readily provide any desired number of visual display units. The second display housing 104 is depicted in a stowed position in FIG. 1, but may be moved to a deployed position, described below, as desired by the operator.

Figure 2:
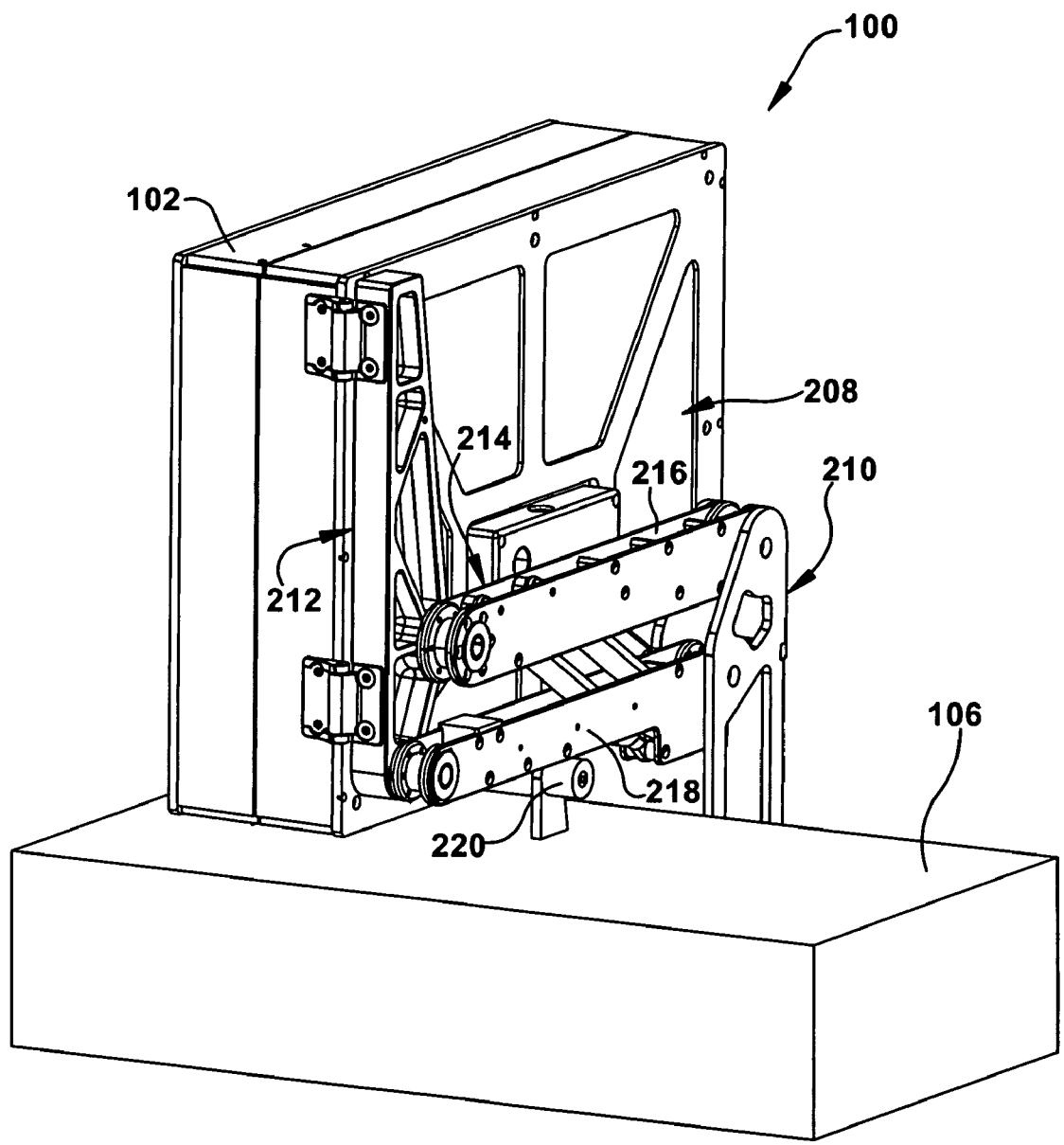
FIG. 2 depicts a cross-sectional view taken along the line 2-2 of FIG. 1.

FIG. 2 is a cross-sectional view of the deployable display apparatus 100 taken along line 2-2 of FIG. 1, showing only the first display housing 102 and associated structures. FIG. 2 depicts more fully the connection between the first display housing 102 and the base surface 106. In the Figures, the second display housing 104 is connected to the base surface 106 in a similar manner as the connection of the first display housing 104, and thus will not be separately discussed in detail.

In FIG. 2, a first mounting arm 208 is shown, having spaced-apart first and second arm ends 210 and 212, respectively. The first arm end 210 is stationary relative to the base surface 106. The term "stationary" is intended herein to indicate a lack of translational motion; a "stationary" first arm end 210 may pivot in place while remaining in substantially the same location with respect to the base surface 106. The second arm end 212 is attached to the first display housing 102 in any suitable manner; a hinged connection is presumed in the following description. The first mounting arm 208 is configured to selectively move the first display housing 102 between stowed and deployed positions.

The first mounting arm 208 depicted in the Figures has a multi-piece construction, in which the first arm end 210 is a mounting mast affixed to the base surface 106. The second arm end 212 in this multi-piece first mounting arm 208 is a bracket hingedly attached to the first display housing 102. Extending between the first and second arm ends 210 and 212 is an intermediate arm portion 214 including two parallel links 216 and 218, each of which is pivotally connected to both the first and second arm ends 210 and 212. In this manner, the first mounting arm 208 may include a multi-piece four bar mechanism, with at least a portion of the first mounting arm having a variable parallelogram structure to assist in supporting and moving the first display housing 102 through and in the stowed and deployed positions. The term "variable parallelogram" is used herein to indicate a structure having a plurality of links connected together by a plurality of pivot joints, and at least one pivot joint is pinned to remain in a fixed position with respect to the base surface 106 while the non-pinned joints translate with respect to the base surface. One of ordinary skill in the art, however, could readily provide a first mounting arm 208 having any suitable structure, operation, configuration, and/or construction as desired.

With the first display housing 102 in the stowed position of FIG. 2, the first mounting arm 208 is shown as contacting a stop block 220 affixed to the base surface 106. The stop block 220, when provided, may be used to cushion and support the first mounting arm 208, as well as aid in guiding the first display housing 102 into the stowed position. Manual or automatic latching means (not shown) may also or instead be provided to secure the first display housing 102 in at least one of the stowed and deployed positions. A manual or automatic, powered or passive, assist device (not shown) may be provided for selectively moving, or helping an operator move, the first display housing 102 between the stowed and deployed positions. For example, a spring, hydraulic/pneumatic cylinder, elastic band, counterweight, or other assist device may be attached to at least one of the first and second arm ends 210 and 212 and a parallel link 216 or 218 to help lift the first display housing 102 into the deployed position or control a descent of the first display housing 102 into the stowed position. As another example, the first display housing 102 or another portion of the deployable display apparatus 100 may be counterbalanced by a spring or other means (not shown) to offset the weight of the supported visual display units.

Figure 3:
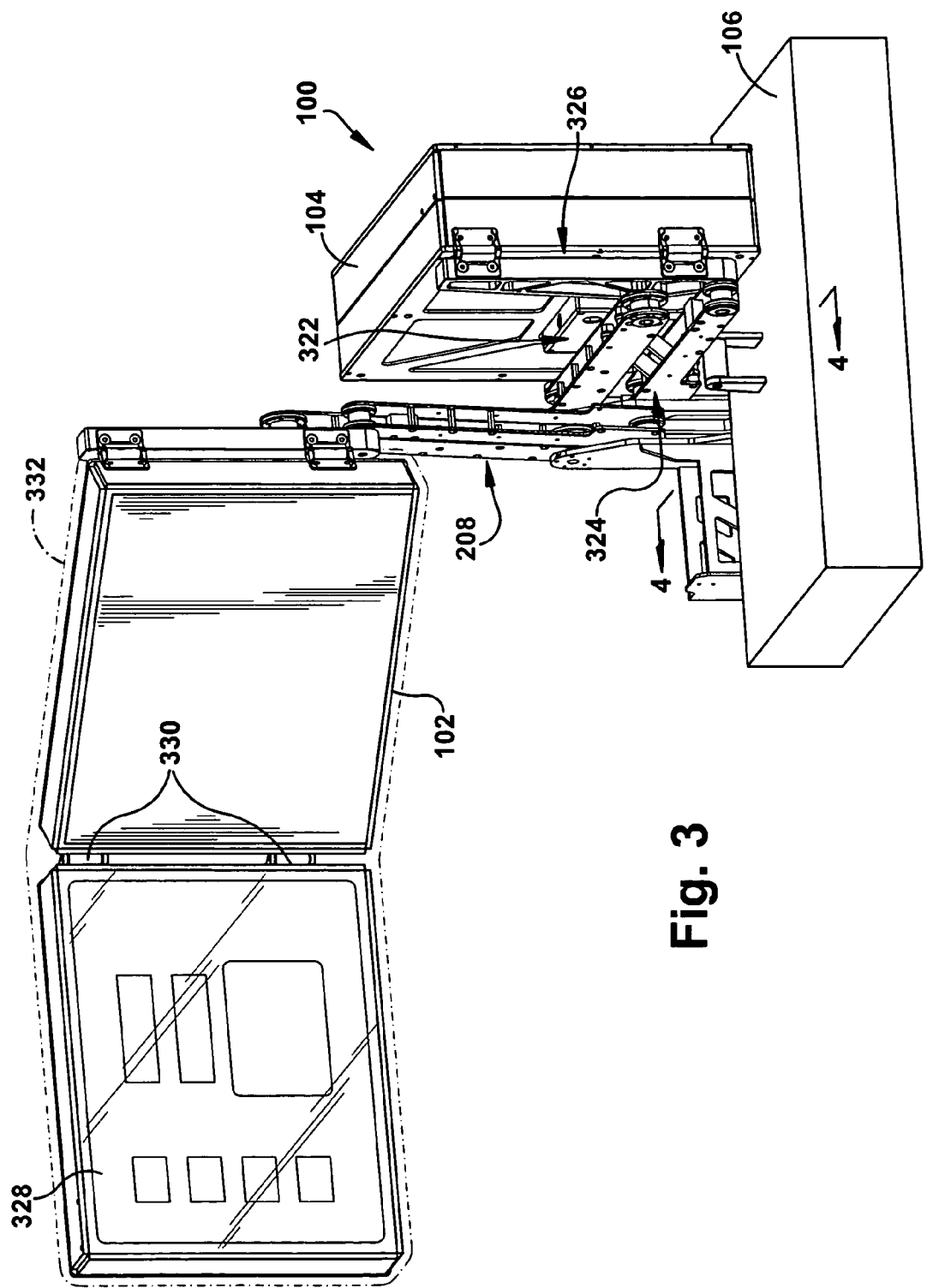
FIG. 3 depicts a perspective view of a deployable display apparatus in a partially deployed position, in accordance with an aspect of the present invention.

In FIG. 3, the second display housing 104 remains in the stowed position, but the first display housing 102 has been manipulated into the deployed position. With the first display housing 102 deployed, it may be seen that the deployable display apparatus 100 also includes a second mounting arm 322 having spaced-apart first and second arm ends 324 and 326, respectively. The first arm end 324 is stationary relative to the base surface 106. The second arm end 326 is attached to the second display housing 104 in any suitable manner; a hinged connection is presumed in the following description. The second mounting arm 322 is configured to selectively move the second display housing 104 between stowed and deployed positions. As the first and second display housings 102 and 104 and the first and second mounting arms 208 and 322 are similar to each other, common description of structure and operation will hereafter not be repeated for each.

As seen in FIG. 3, the first display housing 102 is configured to support a plurality of visual display units 328 (only one shown, for clarity). These visual display units 328 are configured to selectively provide visual information to an operator, and may be a video screen, a touchscreen, a paper display bracket, any other information display tool, or any combination thereof. All of the visual display units 328 of a single deployable display apparatus need not have the same type, size, configuration, construction, material, or any other properties. The visual display units 328 may be self-contained, or in wired or wireless communication with a central processing unit (not shown). The visual display units 328 may be attached to the first and second display housings 102 and 104 in any suitable manner, and may, likewise, be provided with power and control signals in any suitable manner. It is contemplated that different visual display units 328 may be provided to the first display housing 102, either as a part of the manufacturing process, or as an occasional or habitual field modification.

The first display housing 102 may be hinged at connection 330 to allow selective relative pivotal motion between the plurality of visual display units 328. Because of the connection 330, the first display housing 102 can open and close, like a book, to protect and/or conceal the visual display units 328 contained therein, regardless of whether the first display housing is in the stowed or deployed position. The angle to which the first display housing 102 is opened may be preset (e.g., by a limiting mechanism [not shown] in the connection 330) or may be manually chosen and/or adjusted by a user. A manual or automatic assist device (not shown) may be provided to relatively pivot the plurality of visual display units 328.

It is contemplated that, when provided with connection 330 or another hinged/folding mechanism, the first display housing 102 will normally be open, as shown in FIG. 3, in the deployed position and normally be closed, as shown in FIG. 1, in the stowed position. However, the open/closed conditions of the first display housing 102 may be independent of the deployed/stowed positions thereof. Likewise, and as shown in FIG. 3, the open/closed conditions and deployed/stowed positions of the first display housing 102 are independent from those of the second display housing 104.

The first mounting arm 208 may be attached to the first display housing 102 in any suitable manner. In the example configuration of FIG. 3, the first mounting arm 208 is attached to the first display housing 102 at a location adjacent one of the visual display units 328 and spaced apart from at least one other visual display unit (not shown) by at least a portion of the first visual display unit. In other words, when the first display housing 102 is configured to support a plurality of visual display units 328, at least one of those visual display units may be supported by the first mounting arm 208 in a cantilevered manner, with at least a portion of another visual display unit interposed therebetween.

The first display housing 102, when in the deployed position, occupies a first display volume 332, which is approximately indicated by a dashed line in FIG. 3; the dashed line is spaced slightly apart from the actual volume occupied by the first display housing, for clarity. When deployed, the first display housing 102 may be placed close to eye level and at a proper orientation and distance from the operator to minimize neck and eye strain and facilitate extended use of the deployable display apparatus 100. The dimensions and configuration of the first mounting arm 208 may be chosen such that, when in the stowed position, the first display housing 102 is wholly outside the first display volume 332. (The first display volume 332 does not move relative to the base surface 106 along with the first display housing 102.) Because of the spatial displacement of the first display housing 102 between the deployed and stowed positions, an operator may selectively utilize the visual display units 328 supported by the first display housing.

Stated differently, the operator is able to access information using the visual display units 328 when the first display housing 102 is deployed and in the first display volume 332, but the first display housing 102 may be moved to the stowed position when not needed, thus freeing up the first display volume 332 for other tasks by the operator. In this manner, the operator may provide full attention to, and have easy spatial and visual access to, any of a number of primary tasks when the visual display units 328 are not needed (i.e., stowed). For example, the first display housing 102, when in the deployed position, may visually interfere with an operator's ability to perform a primary task. Some examples of primary tasks include, but are not limited to, operation of a machine (e.g., a motor vehicle, a manufacturing line, or any other suitable machine) or a subsystem thereof, monitoring an area (e.g., watching a public space or conveyor belt), and selecting items from an array of compartments. The selective nature of the deployable display apparatus 100 may be especially desirable when the operator's working environment has limited space, or when the mobility of the operator is constrained, a further example of which will be discussed in detail below.

Figure 4:
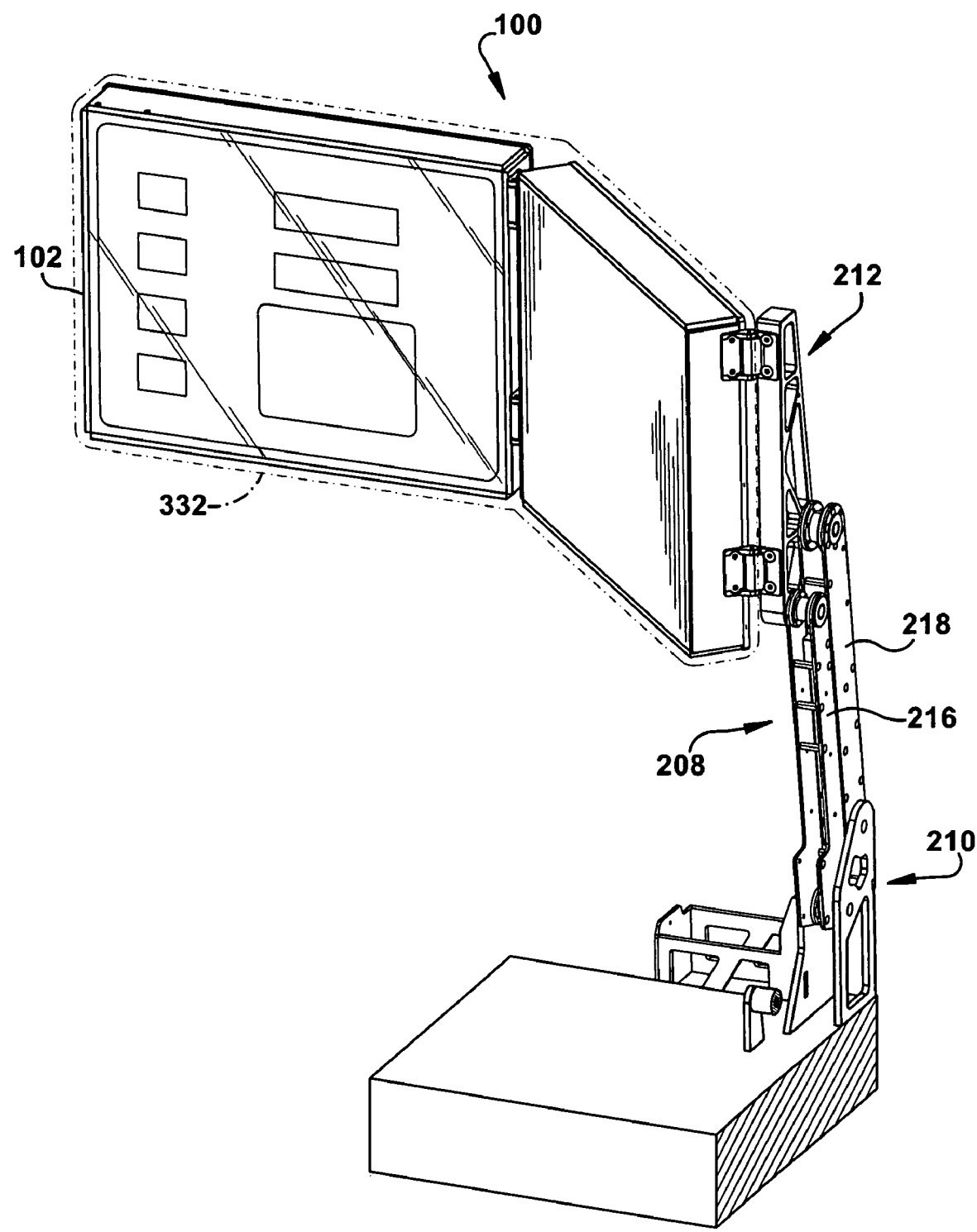
FIG. 4 depicts a cross-sectional view taken along the line 4-4 of FIG. 3.

FIG. 4 is a cross-section taken along line 4-4 of FIG. 3, and depicting the first mounting arm 208. The first display volume 332 is shown from a different angle in this view,. Parallel links 216 and 218, in the variable parallelogram configuration, are located close together; indeed the relative dimensions thereof may be chosen to physically interfere and thereby stop the first display housing 102 from further motion once a desired deployed position has been reached.

The deployed position shown in FIG. 4 is a fully deployed position (i.e., the first mounting arm 208 is fully extended), but it should be understood that the first and second display housings 102 and 104 may be placed in any number of intermediate, partially deployed positions between the depicted stowed and deployed positions, for any desired length of time.

A detent mechanism (not shown) may be provided to assist in holding the first and/or second display housings 102 and 104 in a partially deployed position, as desired.

Figure 5:
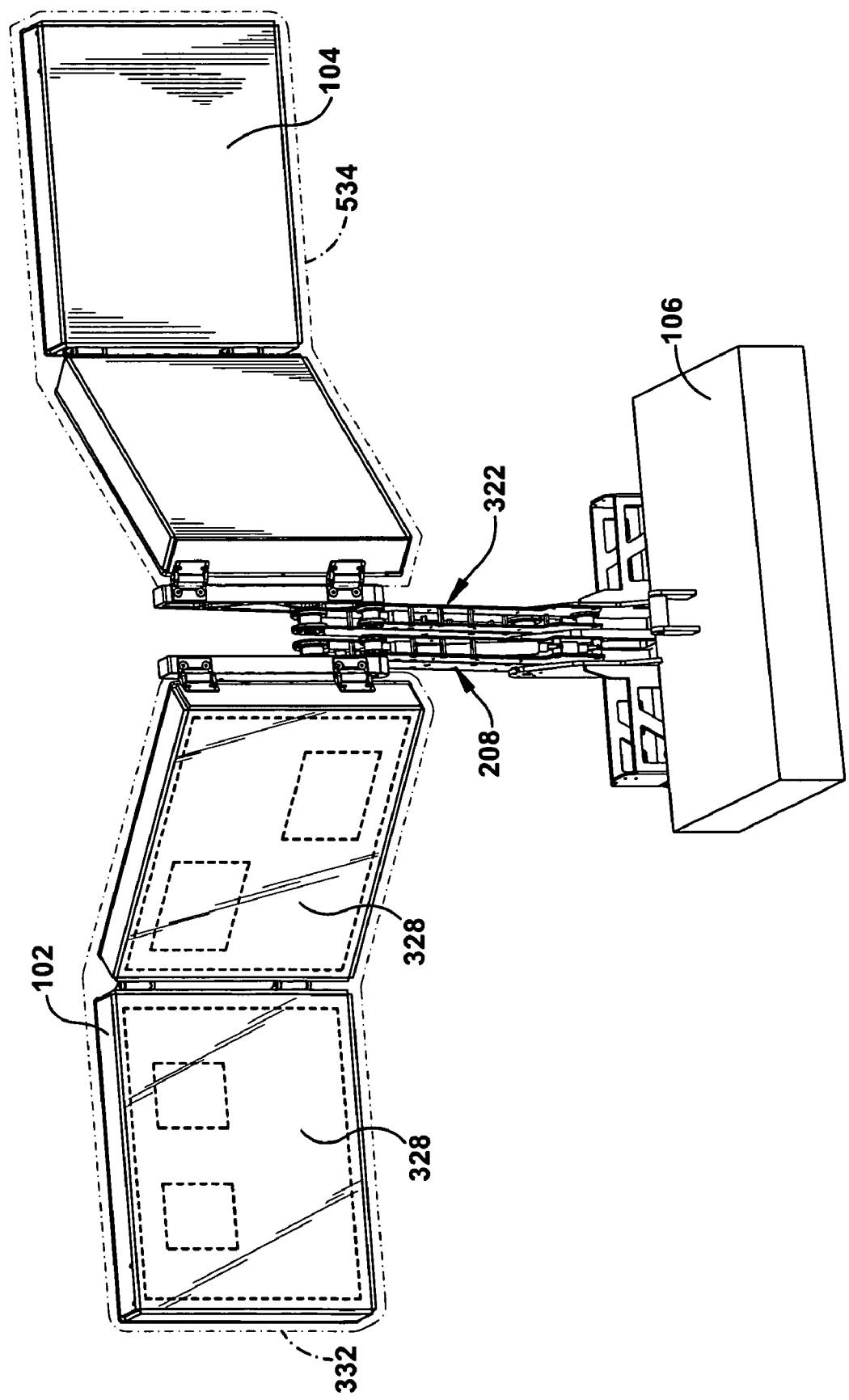
FIG. 5 depicts a front view of a deployable display apparatus in a fully deployed position, in accordance with an aspect of the present invention.

In FIG. 5, both the first and second display housings 102 and 104 are shown in deployed positions. Two visual display units 328 are depicted as being mounted on the first display housing 102, with corresponding visual display units intentionally omitted from the FIG. 5 depiction of the second display housing 104. A dashed line is provided to show the approximate location of the second display volume 534. It should be noted that the relative positions and configurations of the first and second display housings 102 and 104 and/or the first and second mounting arms 208 and 322 may be chosen such that neither of the first and second display housings, when deployed, extends into the respective other's display volume. Alternately, and particularly when the first and second display housings 102 and 104 are not intended for concurrent deployment, at least a portion of one of the first and second display volumes 332 and 534 may be superimposed on the other. It should also be appreciated that the first and second display housings 102 and 104 are not necessarily independent, but may be linked in any suitable manner, including via connection of both to the same mounting arm 208 or 322.

Figure 6:
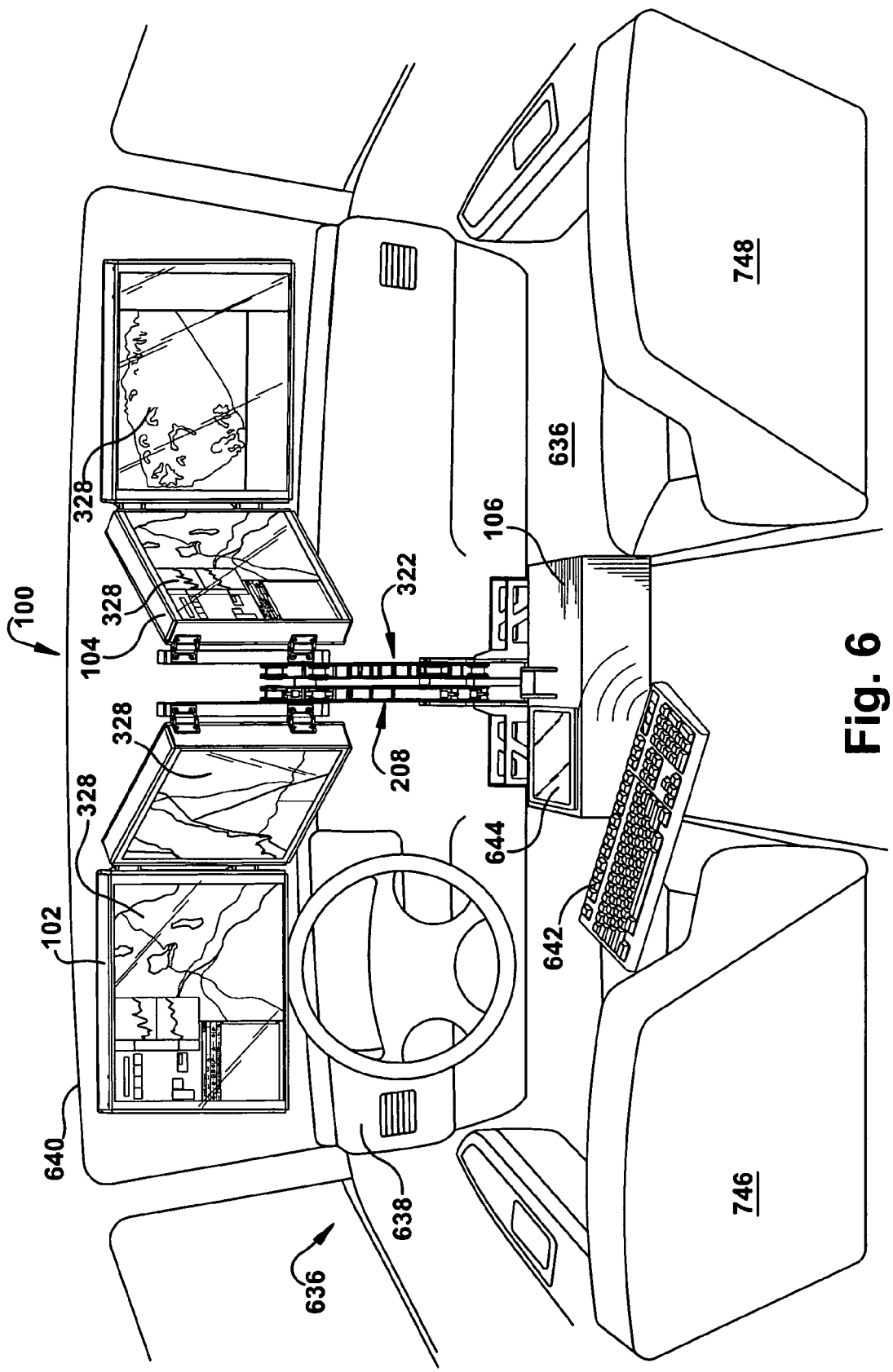
FIG. 6 depicts a schematic front view of the deployable display apparatus of FIG. 5 in an example use environment.
Figure 7:
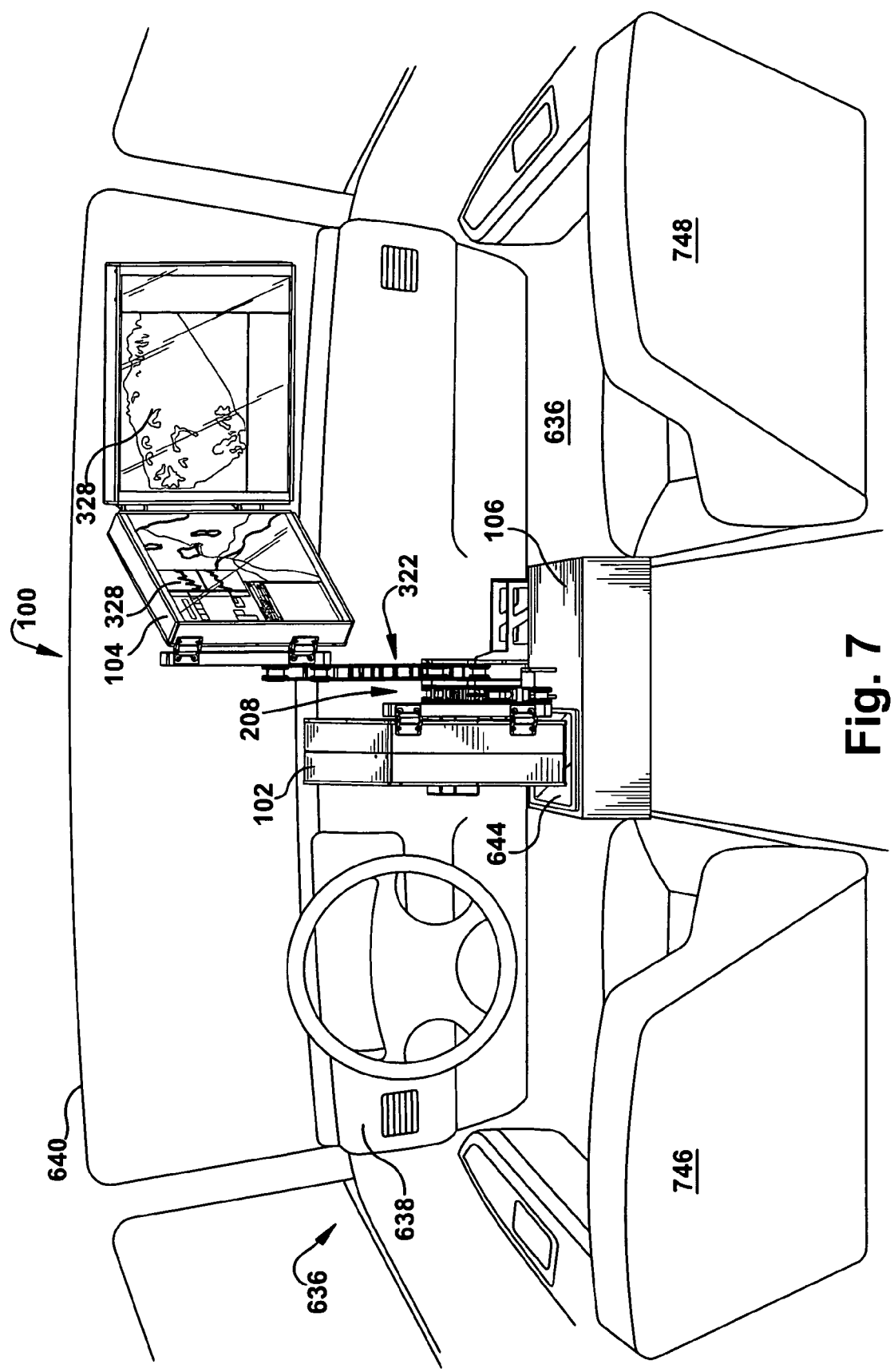
FIG. 7 depicts a schematic perspective view of the deployable display apparatus of FIG. 6.

FIGS. 6 and 7 schematically depict the deployable display apparatus 100 in an example use environment; here, the deployable display apparatus is provided for use in a personnel compartment 636 of a vehicle, such as a Humvee. The personnel compartment 636 includes a necessary driving volume, which may vary for each driver, but which may be defined as the space inside the personnel compartment which is needed for the driver's lines of sight and motion during normal operation of the vehicle. For example, the necessary driving volume may be at least partially defined by a dashboard 638 of the vehicle and a headliner 640 of the vehicle—i.e., the vertical space normally available for a driver to look through a windshield (not shown) of the vehicle. One of ordinary skill in the art will appreciate that the necessary driving volume is not absolutely required for all instances of vehicle operation; for example, in an emergency or if the surrounding area is free from traffic, "normal operation" may be superseded when a driver operates the vehicle using less than the necessary driving volume for sight and motion.

FIG. 6 is a view substantially looking forward from the driver's position within the personnel compartment 636, with the first display housing 102 (hereafter a "driver-side display housing") being extended on the first mounting arm 208 (hereafter a "driver-side mounting arm") into the deployed position. It is intuitively obvious that the driver-side display housing 102, when in the deployed position as in FIG. 6, at least partially occupies the necessary driving volume. When the driver-side display housing 102 is deployed, a driver of the vehicle may make use of the visual information selectively presented by the visual display units 328. For example, when the vehicle is stopped and the driver does not need to drive the vehicle (i.e., perform a primary task), the driver-side display housing 102 may be deployed so that the driver can check a map, refer to a manual, or otherwise view information on one or more visual display units 328. Particularly when means is provided for the driver to interact with the visual information, the deployable display apparatus 100 may be useful in an application such as providing an interim command center, as previously mentioned.

To facilitate operator interaction therewith, the deployable display apparatus 100 may include one or more user input devices. Suitable user input devices include, but are not limited to, a touchscreen visual display unit 328, a wired or wireless keyboard 642, a mouse (particularly a 3-dimensional mouse, not shown), a joystick (not shown), a trackball (not shown), a touchpad (not shown), and a voice data entry system (not shown). One or more user input devices may be present when the deployable display apparatus 100 is used in an information center application. The deployable display apparatus 100 and components thereof, such as visual display units 328 or wireless keyboards 642, should be placed in easy reach of the operator in both the deployed and stowed. However, at least a portion of the deployable display apparatus 100 may be optionally positioned to avoid interference with existing vehicle systems, such as, but not limited to, radios, heating/cooling vents, and other displays and operator information devices (i.e., dashboard vehicle status displays). For example, a wireless keyboard 642 may be stored in a structure connected to and/or supporting the base surface 106, or the driver-side display housing 102 may be shaped to avoid interference, when deployed, with an airstream traveling toward the operator from a heating/cooling vent.

Additionally, it is contemplated that at least one secondary display housing 644 could be provided to the deployable display apparatus 100. The secondary display housing 644 is configured to support at least one secondary visual display unit (not shown), with the secondary visual display unit being wholly outside the necessary driving volume and optionally being configured for use when the driver-side display housing 102 is in the stowed position. For example, a secondary visual display unit supported by the secondary display housing 644 shown in FIG. 6 would be visible to the driver of the vehicle even when the driver-side display housing 102 is stowed. Therefore, visual information, such as a map and/or GPS directions, could be provided to the driver even while the primary task (here, driving the vehicle) is being performed. Another potential location for a secondary display housing 644 is on a surface of the driver-side display housing 102 when in a stowed position.

It should be noted that the second display housing 104 (hereafter a "passenger-side display housing") is shown in FIG. 6 as being in a deployed position, as well. In the view of FIG. 6, two visual display units 328 are shown. However, as depicted in other Figures and previously discussed, the driver-side and passenger-side display housings 102 and 104 may each include any desired number of visual display units 328, and may readily be configured by one of ordinary skill in the art for a particular application of the present invention.

FIG. 7 is a view from above and slightly behind that of FIG. 6, and depicts the driver-side display housing 102 in the stowed position, as well as the passenger-side display housing 104 having a plurality of visual display units 328. When in the stowed position, the driver-side display housing 102 is wholly outside the necessary driving volume, and the driver can operate the vehicle without interference, visual or otherwise. As is apparent from FIG. 7, the driver-side and passenger-side mounting arms 208 and 322 may each be configured for independent selective movement of the driver-side and passenger-side display housings 102 and 104, respectively, between the respective stowed and deployed positions.

Additionally, the structure and configuration of the passenger-side mounting arm 322 may be chosen such that the passenger-side display housing 104, in both the stowed and deployed positions, is substantially outside the necessary driving volume. In this manner, a passenger can use one or more visual display units 328 associated with the passenger-side display housing 104 while the driver is operating the vehicle. A portion of the passenger-side display housing may, however, be within a portion of the necessary driving volume when the driver chooses to operate the vehicle, under certain circumstances such as those previously mentioned. Alternatively, and particularly when the passenger-side display housing 104 does occupy at least a portion of the necessary driving volume when fully deployed, the passenger-side display housing may be configured to selectively dwell in a partially deployed position which is substantially outside the necessary driving volume to allow passenger use of the visual display units 328 during operation of the vehicle without overly interfering with the driver's lines of sight or motion.

The personnel compartment 636 may include a driver seating area 746 and a passenger searing area 748. When in a stowed position, the driver-side and/or passenger-side display housings 102 and 104 may be at least partially interposed between the driver seating area 746 and the passenger seating area 748, as shown for the driver-side display housing in FIG. 7. The phrase "interposed between" is used herein to indicate the whole area within the personnel compartment 636 located between the areas generally occupied by the driver's and passenger's bodies, not just laterally between the seatbacks or seatpads. When the deployable display apparatus 100 is stowed, the driver-side and/or passenger-side display housings 102 and 104 may be folded into a compact volume, outside of sightlines necessary for safe driving, operation of existing vehicle systems, and verbal and non-verbal communication between personnel in or near the vehicle. For instance, a stowed driver-side and/or passenger-side display housing 102 and 104 may be located atop an engine/transmission "tunnel" (housing or structure, not shown) extending through the middle of the vehicle. As another example, a stowed driver-side and/or passenger-side display housing 102 and 104 may be located substantially on a floor area (not shown) of the vehicle between mounting brackets for the respective driver's and passenger's seats (which may also be atop the engine/transmission tunnel), or may be located on a bench seat between the driver and the passenger; the stowed housing would be considered to be at least partially interposed between the driver seating area 746 and the passenger seating area 748 in both of these configurations, as well as in many others which could be identified by one of ordinary skill in the art.

Regardless of placement within the vehicle, the deployable display apparatus 100 should be securely mounted to a portion of the vehicle structure and secured to avoid shifting and/or inadvertent full or partial deployment at an undesirable time. The deployable display apparatus 100 may be at least semi-permanently mounted to a particular vehicle, or may be configured for removability, such as through the use of a mounting platform having quick-release latches, for example. Any suitable structure (not shown) may be interposed between the deployable display apparatus 100 and any portion of the vehicle, such as, but not limited to, an adapter, mounting platform, support bracket, leveling shelf, or the like.

The placement of the deployable display apparatus 100 is not limited to a personnel compartment 636 of a vehicle, but may be used anywhere it is desirable to combine stowage of multiple display and interaction units in a compact volume with selective deployment into a desired configuration. However, the deployable display apparatus 100, when used in a vehicle, is movable between a stowed mode (for mobile operation of the vehicle) and a deployed mode (for use of the deployable display apparatus 100 when the vehicle is stationary). In the stowed mode, it may be desirable for the deployable display apparatus 100 to avoid obstruction of the necessary driving volume or interference with personnel communication. In the deployed mode, the deployable display apparatus 100 may be configured to avoid interference with vehicle features desired during stationary operation of the vehicle, such as, but not limited to, radios, sensors, operator comfort systems, and sightlines desired for visual crew communication. Moreover, and regardless of use environment, the deployable display apparatus 100 should be easily and quickly moved between the stowed and deployed modes, optionally with little to no specialized tools or operator training required.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. For example, descriptions of structures and properties made with reference to the first display housing 102 and first mounting arm 208 should be considered to apply, as well, to similar or analogous structures and properties of the second display housing 104 and second mounting arm 322, though such description was not explicitly repeated with reference to the latter two elements. Accordingly, the present invention is intended to embrace all such alterations, modifications and variations that fall within the spirit and scope of the appended claims.

What is claimed is:

1. A deployable display apparatus for providing a plurality of visual display units to a vehicle, the vehicle having a personnel compartment including a necessary driving volume, the deployable display apparatus comprising:

at least one display housing, at least one display housing being configured to support at least one visual display unit, the visual display unit being configured to selectively provide visual information to an operator; and at least one mounting arm, having spaced-apart first and second arm ends, the first arm end being stationary relative to a base surface, and the second arm end being attached to the display housing, the mounting arm being configured to selectively move the display housing between stowed and deployed positions; such that at least one display housing, when in the deployed position, at least partially occupies the necessary driving volume, and the display housing, when in the stowed position, is wholly outside the necessary driving volume the necessary driving volume being the space inside the personnel compartment which is needed for driver's line of sight motion during normal operation of the vehicle.

2. The deployable display apparatus of claim 1, wherein at least one display housing is hinged to allow selective relative pivotal motion between a plurality of visual display units supported by the at least one display housing.

3. The deployable display apparatus of claim 1, further comprising an assist device for selectively moving the at least one display housing between the stowed and deployed positions.

4. The deployable display apparatus of claim 1, wherein the necessary driving volume is at least partially defined by a dashboard of the vehicle and a headliner of the vehicle.

5. The deployable display apparatus of claim 1, wherein the at least one display housing, when in the stowed position, is at least partially interposed between a driver seating area and a passenger seating area.

6. The deployable display apparatus of claim 1, wherein the mounting arm is a driver-side mounting arm attached to at least one driver-side display housing, and the deployable display apparatus further comprises a passenger-side mounting arm having spaced-apart first and second passenger-side arm ends, the first passenger-side arm end being stationary relative to a base surface, and the second passenger-side arm end being attached to at least one passenger-side display housing, the passenger-side mounting arm being configured to selectively move the passenger-side display housing between stowed and deployed positions, and wherein the passenger-side display housing, in both the stowed and deployed positions, is substantially outside the necessary driving volume.

7. The deployable display apparatus of claim 6, wherein the driver-side and passenger-side mounting arms are each configured for independent selective movement of the at least one driver-side and at least one passenger-side display housings between the respective stowed and deployed positions.

8. The deployable display apparatus of claim 1, including at least one secondary display housing configured to support at least one secondary visual display unit, the secondary visual display unit being wholly outside the necessary driving volume.

9. The deployable display apparatus of claim 1, including latching means to secure the at least one display housing in at least one of the stowed and deployed positions.

10. The deployable display apparatus of claim 1, wherein at least a portion of the mounting arm is a variable parallelogram.

11. A system for selectively displaying visual information, the system comprising:
   a first display housing, configured to support a plurality of visual display units, the plurality of visual display units configured to selectively provide visual information to an operator; and
   a first mounting arm, having spaced-apart first and second arm ends, the first arm end being stationary relative to a base surface, and the second arm end being attached to the first display housing, the first mounting arm being configured to selectively move the first display housing between stowed and deployed positions; such that
   the first display housing, when in the deployed position, occupies a first display volume, and the first display housing, when in the stowed position, is wholly outside the first display volume the necessary first display volume being the space inside the personnel compartment which is needed for driver's line of sight motion during normal operation of the vehicle.

12. The system of claim 11, wherein the first display housing, when in the deployed position, visually interferes with the operator's ability to perform a primary task.

13. The system of claim 11, further comprising first and second visual display units supported by the first display housing, and wherein the first mounting arm is attached to the first display housing at a location adjacent the first visual display unit and spaced apart from the second visual display unit by at least a portion of the first visual display unit.

14. The system of claim 11, wherein the first display housing is hinged to allow selective relative pivotal motion between at least two of the plurality of visual display units.

15. The system of claim 11, further comprising an assist device for selectively moving the first display housing between the stowed and deployed positions.

16. The system of claim 11, further comprising a second display housing, configured to support at least one visual display unit, the visual display unit being configured to selectively provide visual information to an operator; and
   a second mounting arm, having spaced-apart first and second arm ends, the first arm end being stationary relative to the base surface, and the second arm end being attached to the second display housing, the second mounting arm being configured to selectively move the second display housing between stowed and deployed positions;
   wherein the second display housing, when in the deployed position, occupies a second display volume; and
   wherein the second display housing, when in the stowed position, is substantially outside the second display volume.

17. The system of claim 11, including at least one secondary display housing adapted to support at least one secondary visual display unit, the secondary visual display unit being configured for use when the first display housing is in the stowed position.

18. The system of claim 11, wherein at least a portion of the mounting arm is a variable parallelogram.

19. A deployable display apparatus for a vehicle, the vehicle having a personnel compartment including a necessary driving volume, the deployable display apparatus comprising:
   a display housing configured to support at least one visual display unit, the visual display unit being configured to selectively provide visual information to an operator; and
   at least one mounting arm, having spaced-apart first and second arm ends, the first arm end being stationary relative to a base surface, and the second arm end being attached to the display housing, at least a portion of the mounting arm being a variable parallelogram, the mounting arm being configured to selectively move the display housing between stowed and deployed positions; such that
   the display housing, when in the deployed position, at least partially occupies the necessary driving volume, and the display housing, when in the stowed position, is wholly outside the necessary driving volume the necessary driving volume being the space inside the personnel compartment which is needed for driver's line of sight motion during normal operation of the vehicle.

20. The deployable display apparatus of claim 19, wherein the display housing, when in the stowed position, is at least partially interposed between a driver seating area and a passenger seating area.

21. A deployable display apparatus for a vehicle, the vehicle having a personnel compartment including a necessary driving volume, a driver seating area, and a passenger seating area, the deployable display apparatus comprising:
   a display housing configured to support at least one visual display unit, the visual display unit being configured to selectively provide visual information to an operator; and
   at least one mounting arm, having spaced-apart first and second arm ends, the first arm end being stationary relative to a base surface, and the second arm end being attached to the display housing, the mounting arm being configured to selectively move the display housing between stowed and deployed positions; such that
   the display housing, when in the deployed position, at least partially occupies the necessary driving volume, and the display housing, when in the stowed position, is wholly outside the necessary driving volume and at least partially interposed between the driver seating area and the passenger seating area the necessary driving volume being the space inside the personnel compartment which is needed for driver's line of sight motion during normal operation of the vehicle.

22. The deployable display apparatus of claim 21, wherein at least a portion of the mounting arm is a variable parallelogram.

23. A method for selectively deploying a visual display in a vehicle, the vehicle having a personnel compartment including a necessary driving volume, the method comprising:
- anchoring a first end of a mounting arm to a base surface;
- attaching a second end of the mounting arm to a display housing;
- mounting a plurality of visual display units in the display housing;
- positioning the display housing in a stowed position; and
- manipulating the mounting arm to place the display housing in a deployed position wherein the display housing is at least partially located within the necessary driving volume the necessary driving volume being the space inside the personnel compartment which is needed for driver's line of sight motion during normal operation of the vehicle.

24. The method of claim 23, further comprising manipulating the mounting arm to place the display housing in a stowed position wherein the display housing is at least partially interposed between a driver seating area and a passenger seating area.

25. The method of claim 23, further comprising securing the display housing in at least one of the stowed and deployed positions.

\* \* \* \* \*